Sept. 29, 1931.    H. C. HEATON ET AL    1,825,062
PIPE JOINT
Filed Aug. 13, 1925    3 Sheets-Sheet 1
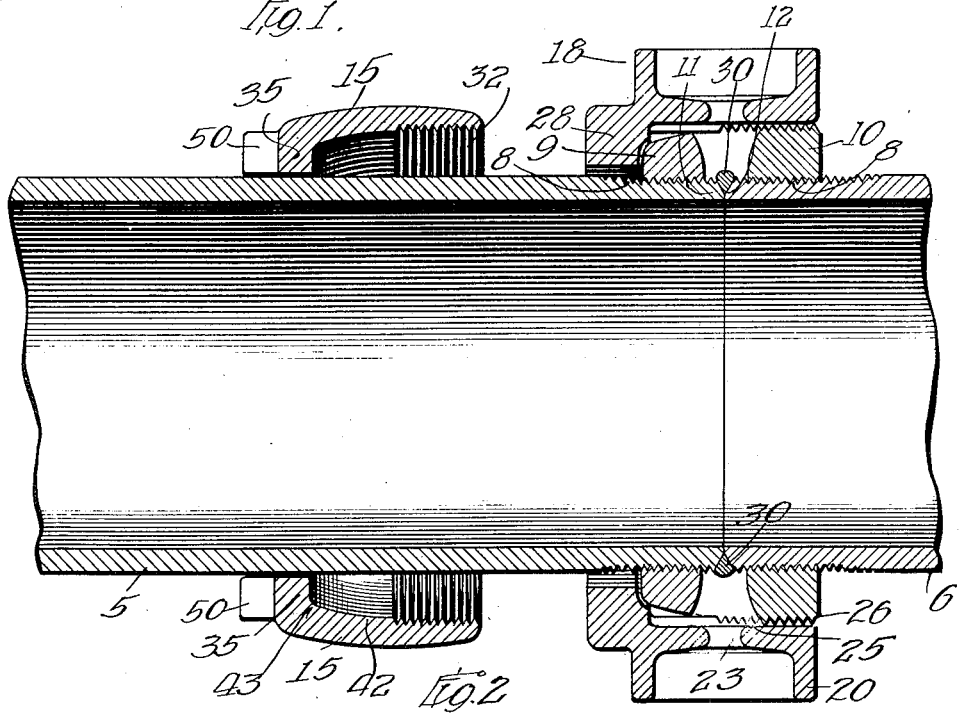
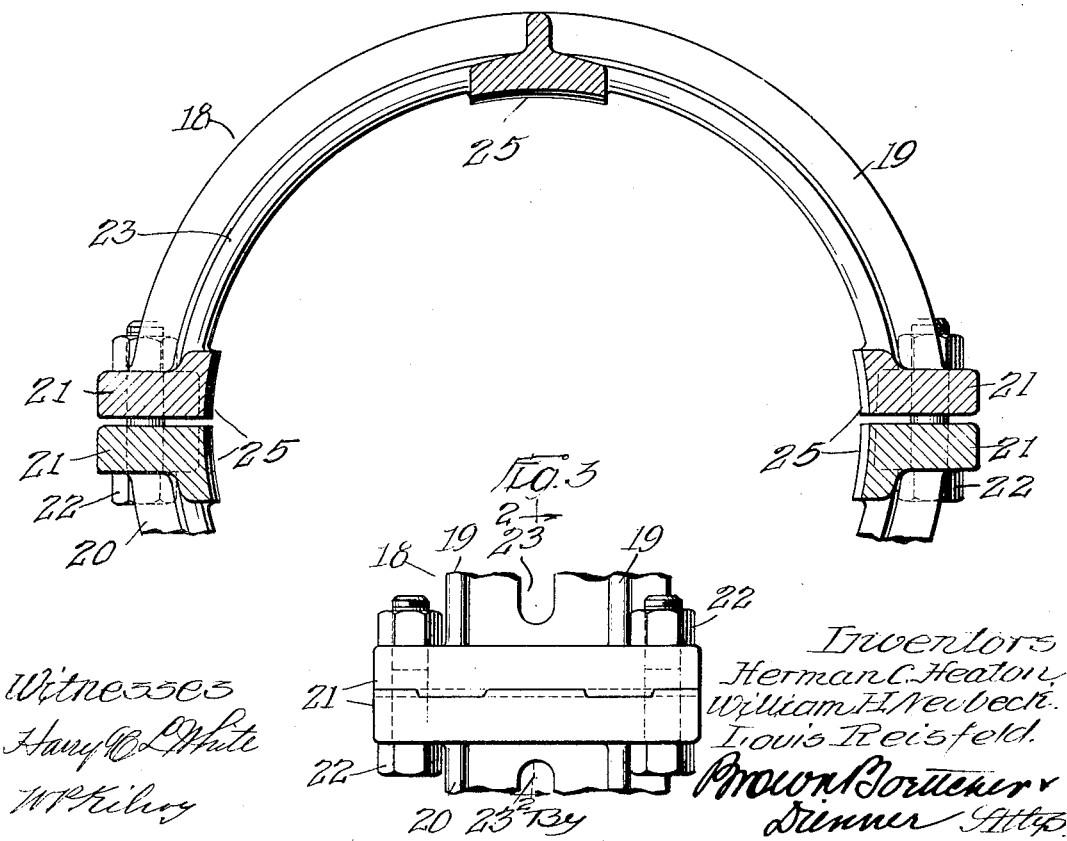

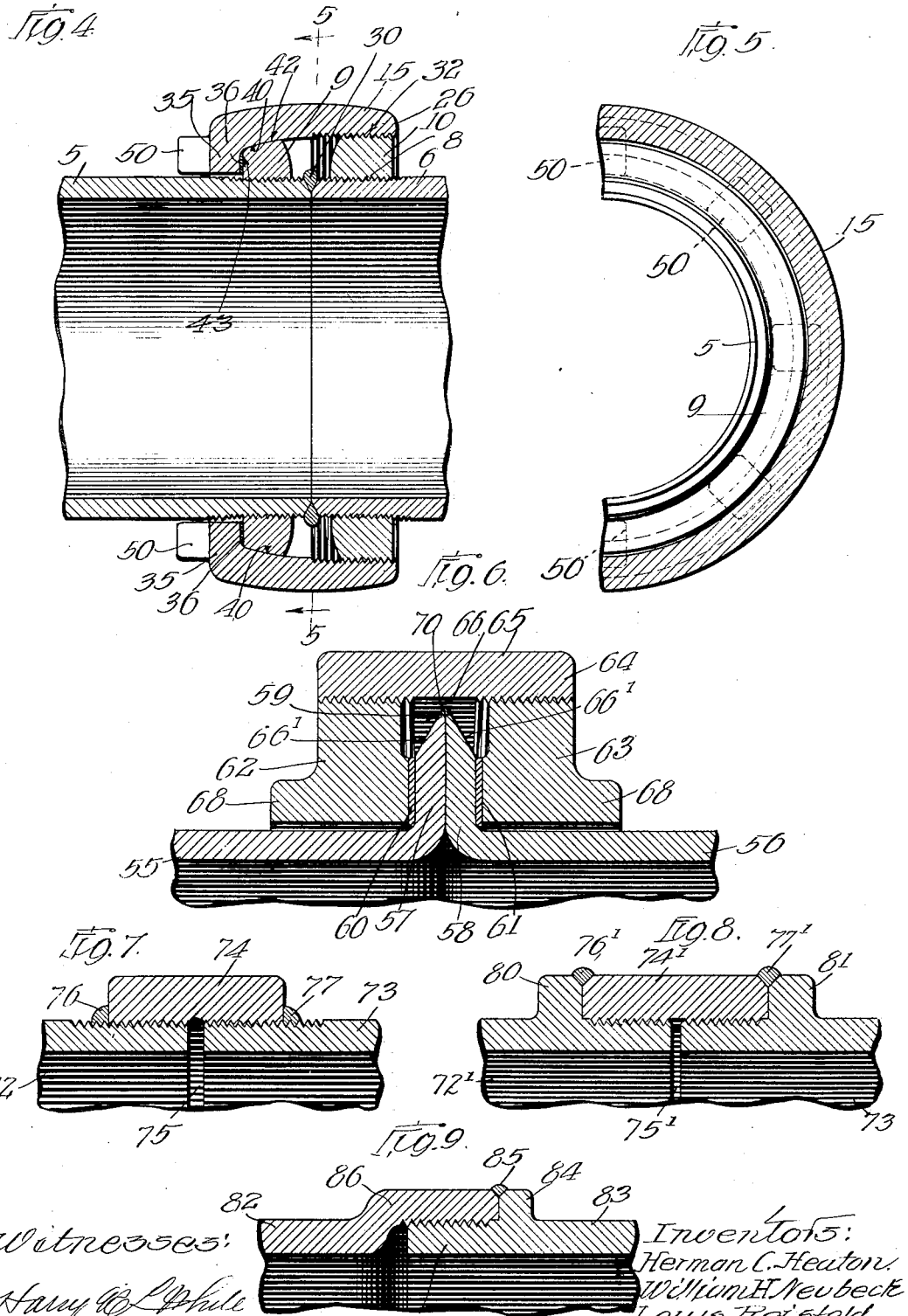

Sept. 29, 1931.  H. C. HEATON ET AL  1,825,062
PIPE JOINT
Filed Aug. 13, 1925  3 Sheets-Sheet 3
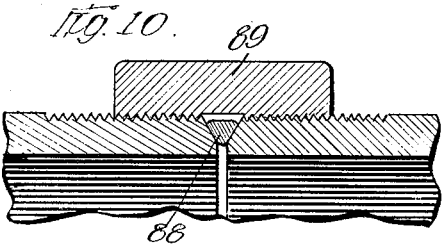
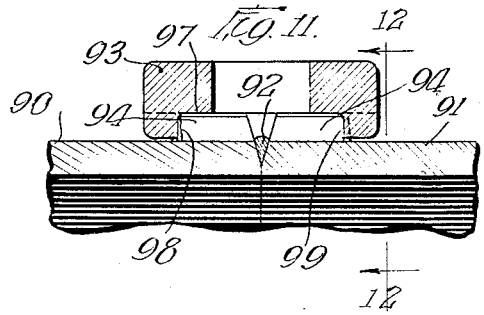
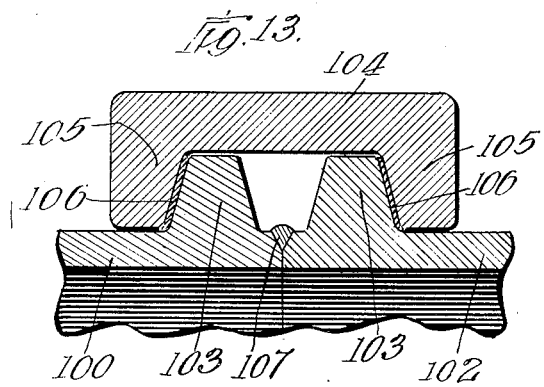
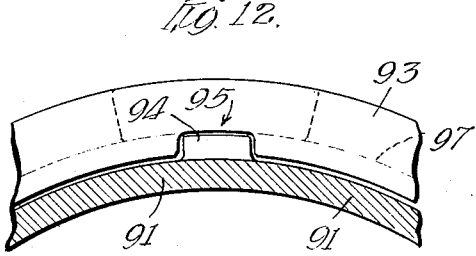
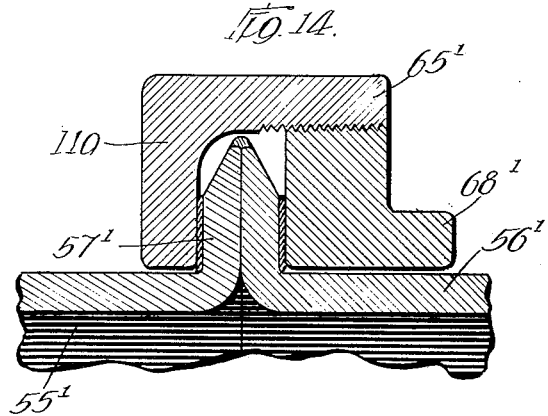
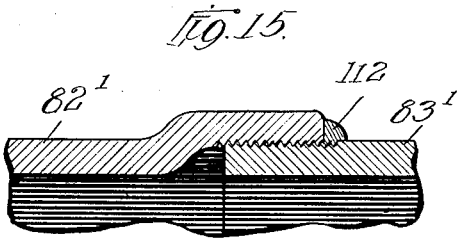
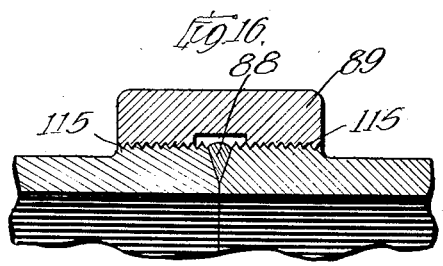

Patented Sept. 29, 1931

1,825,062

UNITED STATES PATENT OFFICE

HERMAN C. HEATON, OF KENILWORTH, AND WILLIAM H. NEUBECK AND LOUIS REISFELD, OF CHICAGO, ILLINOIS, ASSIGNORS TO SARGENT AND LUNDY, INCORPORATED, A CORPORATION OF ILLINOIS

PIPE JOINT

Application filed August 13, 1925. Serial No. 49,878.

Our invention relates to an improved pipe joint and process of forming the same and although especially adapted for joining steam transmission pipes and the like, it is to be understood that our present invention is not limited to any particular use or purpose, but may be employed wherever found desirable.

One object of our invention is to provide a generally improved and simplified joint which will be fluid tight and of great mechanical strength.

Another object is to provide a joint which will be compact and occupy a minimum amount of space.

Another object is to provide a joint that may be formed conveniently and with facility.

Another object is to provide a joint which will permit the welding of straight commercial pipes together and which will protect as well as reenforce the welded joint.

Another object is to relieve the welded joint or seal itself of the mechanical stresses, so that it will not be impaired thereby.

Another object is to provide a joint which will permit slight angular disalignment of the pipes without impairing the joint, and a joint which will not be affected by distortion of the pipes in welding.

Another object is to avoid any impairment of the joint by the expansion and contraction which occurs in welding.

Another object is to increase the resistance of the joint to leakage.

In order to apprise those skilled in the art with the construction and manner of practicing and carrying out our invention, we shall now describe certain specific embodiments of the invention in connection with the accompanying drawings, in which:

Figure 1 is a fragmentary axial section through a pair of abutting pipe ends, showing the initial position of the joint parts thereon and the manner in which the abutting ends of the pipes are clamped together for the welding operation;

Fig. 2 is an end view of the split clamp shown in Figure 1 looking from the left and toward the right in said Figure 1;

Fig. 3 is a vertical sectional view taken on the line 3—3 of Figure 2;

Fig. 4 is a fragmentary axial section showing the completed joint;

Fig. 5 is a transverse section taken on the line 5—5 of Figure 4;

Fig. 6 is a fragmentary view similar to Figure 4 of a modification;

Figs. 7 to 11 are similar views of further modifications;

Fig. 12 is a section on line 12—12 of Fig. 11, and

Figures 13 to 16 are views similar to Figures 7 to 11 of still further modifications.

Referring first to Figures 1 to 5 of the drawings, the pipes or tubes which we provide for joining are shown at 5 and 6.

The adjacent ends of each of these pipes or tubes are externally threaded at 8 and each pipe 5 and 6 is provided with an annular ring member 9 and 10, respectively. These ring members 9 and 10 are internally threaded to thread or screw up on the respective threaded ends of the pipes 5 and 6. The rings 9 and 10 are preferably heated and then screwed or threaded onto the respective ends of the pipes 5 and 6, each being threaded onto its respective pipe sufficiently to allow the ends of the pipes to project therefrom as at 11 and 12, so that there will be suitable projections and ample room or space for welding when these projecting ends are butted together, end to end. The heating of the ring members 9 and 10 facilitates screwing or threading them onto the pipes 5 and 6 and assures or provides a shrink fit of the ring members upon the pipes, after cooling.

Before screwing the ring member 9 upon the pipe 5, an annular coupling sleeve or union 15 is placed upon the pipe 5, or if convenient, this coupling sleeve or union may, of course, be placed upon the pipe 5 from the opposite end after the ring member 9 is secured in place upon the pipe.

The pipes 5 and 6 are then lined up, end to end, with the butting ends 11 and 12 in butt engagement and clamped together, for example, as illustrated in Figure 1. For this purpose, we provide a split clamp 18, which may comprise a pair of semi-circular sections 19 and 20, generally similar in form to the coupling sleeve or union 15. The free ends of each clamp section 19 and 20 has lugs or flanges 21 to receive bolts 22 by means of which and suitable cooperating nuts the two clamp sections are clamped in place upon the threaded ends of the pipes 5 and 6. Each clamp section 19 and 20 has circumferential slots 23 allowing access therethrough to the butting pipe ends, 11 and 12 between the rings 9 and 10, for the purpose of welding said pipe ends 11 and 12 together. The inner surface of each clamp section 19 and 20 also has a plurality of spaced complementary internally threaded portions 25 for threaded engagement with the external threads 26 in the ring member 10, the spaced threaded portions 25 being only on the portions of the clamp 18 between the welding slots 23, thus preventing undue stresses in the clamp during welding. In the particular embodiment of the invention illustrated, the threaded portions 25 are at four equally spaced points about the interior of the clamp 18, although, of course, this may be varied.

One end of the clamp 18 has an annular flange 28 which extends radially inwardly therefrom and cooperates with the adjacent end of the ring member 9. The threaded portions 25 are at the opposite end of the clamp and their threaded engagement with the threads 26 in the ring member 10 together with the cooperation of the flange 28 with the end of the ring member 9 clamps the butting ends 9 and 10 of the pipes 5 and 6 firmly together. There is, however, preferably a slight clearance provided between the flange 28 and the adjacent end of the ring 9 to allow for the contraction and expansion which occurs in welding the ends of the pipes 5 and 6 together.

By the next step of our process the portions of the butting ends 11 and 12, opposite the welding slots or gaps 23 are butt welded together, as indicated at 30. The weld 30 is preferably an ordinary straight butt weld, although of course, bumper blocks or suitable fusion material may be employed or the welding otherwise done to secure the desired tight union and seal between the ends of the pipes. After welding the portions of the abutting ends 9 and 10 opposite or accessible through the slots or gaps 23, the clamp 18 may be given a turn to expose the unwelded portions, initially opposite or adjacent the threaded portions 25 of the clamp and these portions of the butting ends 11 and 12 may then be welded, completing the welded joint 30 and making it continuous about the butting ends 11 and 12.

After completing the welded joint 30, the bolts 22 are then removed, freeing the clamp sections 19 and 20, which are separated and removed from the ends of the pipe.

After removing the clamp 18, the next step is to bring up the coupling sleeve or union 15, previously placed upon the pipe 5, for example, and to screw or thread its internally threaded portion 32 upon the externally threaded portion 26 of the ring member 10 until the radial flange 35 at the opposite end of the sleeve 15 is brought up home or into cooperation with the adjacent end of the ring 9. A gasket 36 preferably of granite where the pipes 5 and 6 are for steam transmission purposes is preferably interposed between the flange 35 and the adjacent end of the ring member 9.

The sleeve or union 15 secures the pipes 5 and 6 firmly together. It provides the mechanical connection between them and relieves the welded joint 30 of the mechanical stresses so that the welded joint is thereby better and longer able to provide and maintain fluid tight seal between the abutting ends of the pipes. In case of failure or leakage of the welded joint 30, the gasket 36 provides an additional precaution and insures against leakage between the sleeve 15 and the ring member 9 while the cooperating threads 32 and 25 provide an added precaution and insure against leakage between the sleeve member 15 and the ring member 10.

The periphery of the ring member 9 is preferably of generally spherical contour at 40 and the cooperating internal surface of the sleeve or coupling 15 is preferably of similar spherical contour 42, providing a spherical surface of engagement between them, the cooperating corners being rounded at 43. The center of the spherical surfaces 40 and 42 is in the intersection of the center line of the pipes with the plane of the butting ends of the pipes. This permits slight angular disalignment of the pipes 5 and 6 and makes a practical joint that may be formed, on the job, with convenience and facility.

By eliminating the necessity of flanging the ends of the pipes 5 and 6, the use of straight ended commercial pipes is permitted and flanging or swedging operations on the ends of the pipes are avoided. The joint requires little space for making it and when complete is exceedingly compact. It occupies appreciably less room than a flanged joint and permits the use of a strong, tight, combination, welded and mechanically connected joint where, due to lack of space, flanges could heretofore be used only with difficulty, or not at all. Furthermore, distortion of the pipes during welding does not impair or affect the joint as is the case with screwed joints where the threads on both pipes have to be matched with the threads of a sleeve not exposed to the welding temperature. The joint is especially suitable for installations where the pipe requires high welding temperature and for installations where, after completion of the joints, the pipes are subjected to high steam temperatures and pressures and other severe conditions, although as already pointed out, the joint which we have provided is not limited to any particular use or purpose, but may be employed wherever found desirable. The joint is mechanically strong and fluid tight, the mechanical coupling reenforcing it and providing additional matched or cooperating surfaces which increase the resistance of the joint to leakage. The effect of possible flaws in the weld are also insured against.

For the purpose of threading up the sleeve or union 15 into engagement with the ring member 10 and for screwing it out of engagement therewith, should that be desirable, we provide the flanged end of the sleeve or union 15 with longitudinally extending lugs 50 spaced circumferentially or annularly thereabout for engagement by a spanner wrench or other suitable tool.

In the embodiment shown in Figure 6, the pipes are indicated at 55 and 56. The ends of the pipes are flared or swedged out to form flanges 57 and 58 at substantially right angles to the pipes. The cooperating surfaces of the flanges 57 and 58 have continuous flat contact while the outer edges may be shaped, as shown, to form an annular groove 59 suitable to receive the molten metal of the weld.

The rear or free surfaces of the flanges 57 and 58 are also preferably faced to provide good contact surfaces for suitable gaskets 60 and 61 which are pressed against the flanges 57 and 58 by ring members 62 and 63 respectively. These ring members 62 and 63 are externally threaded for threaded engagement with the internal threads 64 of a coupling sleeve or union 65. The sleeve 65 is relieved internally centrally between the threads 64, as shown at 66, and the threads at opposite ends of the sleeve are right and left handed respectively so that turning of the sleeve 65 will cause the ring members 62 and 63 to approach the flanges 57 and 58, making a tight joint with the aid of the gaskets 60 and 61 and with the threads 64, even if the weld shown is faulty or develops faulty places.

The ring members 62 and 63 may have lugs or shoulders 68 by means of which said ring members may be held against or prevented from turning while the sleeve or coupling 65 is rotated. The ring members 62 and 63 may be solid or circumferentially continuous or they may be split. Where continuous, they may have to be placed upon the pipes 55 and 56 before flanging or flaring them, whereas in the latter case they may be placed on, in the field, or at the job, after flanging or flaring of the pipes. Split rings also facilitate repair in the field, without the disturbing of the pipes themselves.

A separate clamping member may be employed, as before, in forming the weld 70, or the sleeve or union 65 itself may have openings through which the outer edges of the flanges 57 and 58 may be welded together. The flanges 57 and 58 may be tapered off at 66' so as to not interfere with the joint or its formation. As before the weld 70 forms a tight seal and the ring members 57 and 58 and the sleeve 65 form a mechanical connection bridging the seal, the ring members 57 and 58 and sleeve 65 not only reenforcing the welded joints, but protecting it and providing additional matched surfaces for increasing where the sleeve 65 is without welding openings, the resistance of the joint to leakage.

In Figure 7, the ends of the pipes 72 and 73 are externally threaded and joined by an internally threaded sleeve or union 74 screwed thereon. The sleeve 74 mechanically joins the ends of the pipe which may be spaced slightly at 75 and the cooperation of the threads in the sleeve with the threads on the pipes provides a resistance against fluid leakage. Each of the opposite ends of the sleeve 74 are welded at 76 and 77 to the pipes 72 and 73, respectively, the welded joints and mechanical connection again reinforcing each other and providing an exceptionally tight joint against fluid leakage.

The embodiment of Figure 8 is similar to the embodiment of Figure 7 with the exception that the pipes 72' and 73' are swedged to form shoulders 80 and 81 spaced from the ends of the pipes. The coupling sleeve 74' secures the pipes together and draws the shoulders 80 and 81 into engagement with the opposite ends of the sleeve providing end contact in addition to the threaded engagement. The welded joints are between the ends of the sleeve 74' and the shoulders 80 and 81, as shown at 76' and 77' and the possibility of any weakening of the pipes as by crystallization in the welding operation is avoided.

In the embodiment of Figure 9, one of the pipes 82, 83 is expanded at 86 and threaded to receive the externally threaded end 87 of the other pipe and for threaded engagement thereover. A shoulder 84 swedged on the pipe 83 provides additional or end contact besides the threaded engagement and the weld 85 is between the shoulder and the adjacent end of the pipe 82. Again the possibility of the pipes being weakened, as by crystallization in welding, is avoided and in this case the additional coupling sleeve or union is eliminated.

The embodiment of Figure 10 shows a variation of the embodiment of Figure 7. The end of the pipes are butt welded together at 88 in this case before the coupling sleeve 89 is screwed over the joint. The threads on the pipes in this case, of course, lead in the same direction so that the sleeve 89 may be threaded over the welded joint after welding or withdrawn from the end of one of the pipes before welding, or the sleeve 89 may comprise a split coupling member.

In Figures 11 and 12 we have shown two pipes 90 and 91 butt welded together at 92 and reenforced by a ring 93. The pipes 90 and 91 are each provided on their ends with a plurality of circumferentially spaced cam shaped lugs 94 which, being adapted to slide through corresponding circumferentially spaced slots 95 in the coupling sleeve or ring 93, permit the ring to be slipped over the joint after welding and turned to provide a bayonet connection between it and the lugs 94. The ring 93 has recess 97 in its inner surface and the sides 98 and 99 of the recess are provided with inclined or angular surfaces adjoining the slots 95. The outer ends of the lugs 94 are similarly inclined or angular, so that when the ring 93 is slipped over the welded joint 92 until the lugs 94 are within the recess 97, turning of the ring 93 will complete the bayonet connection and cause the cooperating inclined surfaces to meet. If the angle of these cooperating inclined surfaces is less than the friction coefficient of the members, these inclined surfaces will bind and thereby additionally hold the two pipes together.

In the embodiment of Figure 13, the ends of the pipes 100 and 102 are butt welded together at 107 and the ends of both pipes are provided with annular ribs 103, the outer sides of which are preferably inclined and the two together forming an annular wedge. The ribs are matched with the inner surfaces of the end flanges 105 of a coupling ring 104 which is diametrically split. The two halves of the ring 104, when drawn together with bolts (not shown) will firmly wedge the two welded pipe ends 100 and 102 together, gaskets 106 providing additional insurance against leakage.

In Figure 14, we have illustrated a simplified form of the joint of Figure 6, one of the ring members 68 being omitted, and the coupling sleeve or union having threaded engagement with the other ring member and a flange 110 for cooperation with the other flange 57' of the pipe 55'.

In the embodiment of Figure 15, the joint is substantially like that shown in the embodiment shown in Figure 9 with the exception that the swedged shoulder is omitted and the welded joint 112 is directly between the expanded end of the pipe 82' and the external surface of the pipe 83'.

The joint shown in Figure 16 is identical with that shown in Figure 10 with the exception that in Figure 10 the threads are straight cut in the external surface of the pipe ends whereas in the joint shown in Figure 16, the ends of the pipes are upset at 115 to leave the same amount of metal under the threaded portions of the pipes as there is in the solid run of the pipes themselves.

We claim:—

1. In combination, a pair of pipes having their ends abutted and directly welded together, a ring member on each of said ends, and a coupling sleeve surrounding and engageable with said ring members by turning movement relative thereto for mechanically coupling the ends of the pipe and forming a mechanically sealed compartment about the welded joint and completely enclosing said welded joint.

2. In combination, a pair of pipes having their ends abutted and directly welded together, a ring member on each of said ends, said pipes and said ring members having mechanical attachment lying longitudinally and adjacent to the longitudinal side walls of the pipes and means loosely associated with one of said pipes adapted to be turned thereabout for mechanically joining said ring members, and preventing longitudinal separation of the pipe ends and forming a sealed compartment over the welded joint and completely enclosing said welded joint.

3. In combination, a pair of pipes having their ends welded together, a ring member threaded upon the end of each of said pipes, and a coupling sleeve having threaded engagement with one of said ring members for mechanically joining the ends of said pipes, said mechanical joints increasing the mechanical strength of the pipe joints and adding a mechanical seal to the welded seal.

4. In combination, a pair of pipes having their ends welded together to form a sealed joint, a ring member on each of said ends and a coupling sleeve surrounding said ring members and mechanically joining the ends of the pipes therethrough, said coupling sleeve having rocking cooperation with one of said ring members and threaded engagement with the other.

5. In combination, a pair of pipes having their ends lying in the run of the pipes, said ends being welded together to form a sealed joint, a ring member on each of said ends, a coupling sleeve having threaded engagement with one of said ring members and a shoulder cooperable with the other ring member and a spherical surface of engagement between said coupling sleeve and said last ring member.

6. In combination, a pair of pipes having their ends abutting in the direct line of the pipe walls, and within the outer periphery of said pipes, the ends of said pipes being directly welded together, a ring member secured on each of said ends, and means cooperating with said ring members for mechanically joining said ends, and preventing longitudinal separation of the abutting pipe ends and forming a sealed compartment over the welded joint and completely enclosing said welded joint.

In witness whereof, we hereunto subscribe our names this 10th day of August, 1925.

HERMAN C. HEATON.
WILLIAM H. NEUBECK.
LOUIS REISFELD.